United States Patent [19]
Laakso et al.

[11] Patent Number: 5,170,476
[45] Date of Patent: Dec. 8, 1992

[54] DATA PROCESSOR HAVING A DEFERRED CACHE LOAD

[75] Inventors: Pamela S. Laakso; Bradley Martin, both of Austin, Tex.

[73] Assignee: Motorola, Inc., Schaumburg, Ill.

[21] Appl. No.: 468,021

[22] Filed: Jan. 22, 1990

[51] Int. Cl.$^5$ ............................................. G06F 12/08
[52] U.S. Cl. .................................. 395/425; 395/800; 364/DIG. 1
[58] Field of Search ................. 364/200 MS, 900 MS; 395/400, 425

[56] References Cited

U.S. PATENT DOCUMENTS 4,701,844 10/1987 Thompson et al. ................. 364/200
4,888,689 12/1989 Taylor et al. ......................... 364/200

Primary Examiner—Joseph L. Dixon
Assistant Examiner—Hiep T. Nguyen
Attorney, Agent, or Firm—Charlotte B. Whitaker

[57] ABSTRACT

A data processing system is provided having a secondary cache for performing a deferred cache load. The data processing system has a pipelined integer unit which uses an instruction prefetch unit (IPU) to maintain a steady stream of instructions to the pipeline. The (IPU) issues prefetch requests to a cache controller on a cache half-line basis. In conjunction with the prefetch request, the IPU transfers a prefetch address to a cache address memory management unit (CAMMU), for translation into a corresponding physical address. The physical address is compared with the indexed entries in a primary cache, and compared with the physical address corresponding to the single cache line stored in the secondary cache. When a prefetch miss occurs in both the primary and the secondary cache, the cache controller issues a bus transfer request to retrieve the requested cache line from an external memory. While a bus controller performs the bus transfer, the cache controller loads the primary cache with the cache line currently stored in the secondary cache. Thus, the deferred loading of the primary cache, after the prefetch miss, does not stall subsequent prefetches from the integer unit.

14 Claims, 3 Drawing Sheets

DATA PROCESSOR HAVING A DEFERRED CACHE LOAD

FIELD OF THE INVENTION

This invention relates generally to data processors, and more particularly to a data processor having a cache.

BACKGROUND OF THE INVENTION

In a conventional non-pipelined data processor, each instruction executes to completion before the instruction commences. In order to improve the efficiency of machine operations, while increasing overall performance, pipelined data processors are implemented in conventional data processor designs. These pipelined data processors are capable of executing several instructions concurrently by overlapping sub-operations of successive instructions. Optimally, pipelined processors fetch one new instruction, and complete execution of another instruction every clock cycle. Thus, although the actual execution time required for complex instructions varies, the overall instruction execution rate may approach one instruction per clock cycle. As a result, the use of pipelined processors dramatically improves the overall performance of the data processor.

In order to achieve single cycle instruction execution, an instruction prefetch unit (IPU) must maintain an instruction stream capable of loading the instruction pipeline with the requisite number of instruction words every clock cycle. If the IPU fails to maintain the required instruction stream, and the instruction pipeline is not loaded with the requisite number of instruction words, a pipeline stall may occur. Generally, today's high performance pipelined data processors employ an instruction cache to provide the IPU with rapid access to instruction data (operands). Typically, the instruction cache is maintained by a cache controller, which operates in concert with the IPU to retrieve (prefetch) instructions and keep the instruction buffer (queue) loaded. Accordingly, when the processor requests an instruction prefetch, the cache controller receives the prefetch requests and determines whether the instruction is resident in the instruction cache. If the requested instruction is resident in the cache, a prefetch "hit" occurs, and the cache controller loads the instruction buffer directly from the instruction cache. If the requested instruction is not resident in the cache, a prefetch "miss" occurs, and the cache controller requests a bus transfer to retrieve the required cache line from external memory.

Known cache controllers use a burst mode transfer to transfer a cache line (e.g. 16 bytes) in a single memory access. Typically, in the burst mode, only the starting address of the 16 bytes is transferred to memory, therefore, only one memory access is required. Generally, the cache controller loads the instruction cache with the required cache line, immediately after the data becomes valid. The next prefetch from the processor is, therefore, stalled for a cache load cycle. A performance penalty occurs as a result of the processor stall required for the instruction cache load. Efforts to ameliorate the performance penalty attributable to cache writes from a data bus have centered around the use of buffers to temporarily store the data for a pending cache load. Typically, these buffers (commonly referred to as "push" buffers) provide the requested data to the integer unit, via an internal bus. Generally, previous systems have not provided a mechanism to directly access the cache line stored in the push buffer during a subsequent prefetch request for the same cache line. Thus, although the use of push buffers may alleviate the problem of stalling the processor for a cache load cycle, these push buffers are not accessible in parallel with the instruction cache. Consequently, a subsequent prefetch request from the processor for data contained in the cache line stored in the push buffer results in another bus transfer to retrieve the required data from external memory. This duplicative bus transfer creates yet another performance penalty.

SUMMARY OF THE INVENTION

Accordingly, an object of the present invention is to provide an improved data processor capable of eliminating performance penalities associated with cache loads and instruction prefetches.

It is another object of the present invention to provide an improved data processor having a deferred cache load.

Yet another object of the present invention is to provide a data processor capable of deferring an instruction cache load without causing instruction pipeline stalls.

These and other objects are accomplished in an improved data processing system having a pipelined data processor with an instruction prefetch unit for prefetching from a secondary memory a plurality of data entries, each entry identified by a memory address, and for providing the plurality of data entries to an instruction pipeline in the pipelined data processor. The data processing system comprises: a bus controller, coupled to an external memory, for retrieving a requested cache line containing the plurality of data entries, identified by a memory address, from the external memory, in response to a bus transfer request signal, and for transferring the cache line containing the plurality of data entries onto an internal data bus. A secondary cache, coupled to the bus controller, and the instruction pipeline, receives the requested cache line from the bus controller, loads a predetermined number of the plurality of data entries in the requested cache line into the instruction pipeline, in response to a first control signal, and loads a primary cache memory with the requested cache line, in response to a second control signal. A memory controller, coupled to the pipelined data processor, the bus controller, the primary cache, and the secondary cache, provides the bus transfer request signal, upon the occurrence of a prefetch address miss in both the primary cache memory and the secondary cache, provides the first control signal to load the secondary cache with the requested cache line. The memory controller provides the second control signal to defer the loading of the primary cache, with the requested cache line from the secondary cache, until the occurrence of a subsequent prefetch address miss, in the primary cache memory, for a cache line other than the requested cache line resident in the secondary cache, and provides a third control signal. Addressing logic, coupled to the memory controller, stores the memory address corresponding to the requested cache line stored in the secondary cache, and compares the memory address to a next memory address corresponding to a next prefetch request from the instruction prefetch unit, in response to the third control signal from the memory controller. The addressing logic provides a match signal to the memory controller, thereby indicating whether the next prefetch request is for the cache line stored in the secondary cache.

These and other objects, features and advantages will be more clearly understood from the following detailed description taken in conjunction with the accompanying drawings.

DETAILED DESCRIPTION OF THE INVENTION

The terms "assert", "assertion", "negate" and "negation" will be used to avoid confusion when dealing with a mixture of "active high" and "active low" signals. "Assert" and "assertion" are used to indicate that a signal is rendered active, or logically true. "Negate" and "negation" are used to indicate that a signal is rendered inactive, or logically false.

Figure 1:
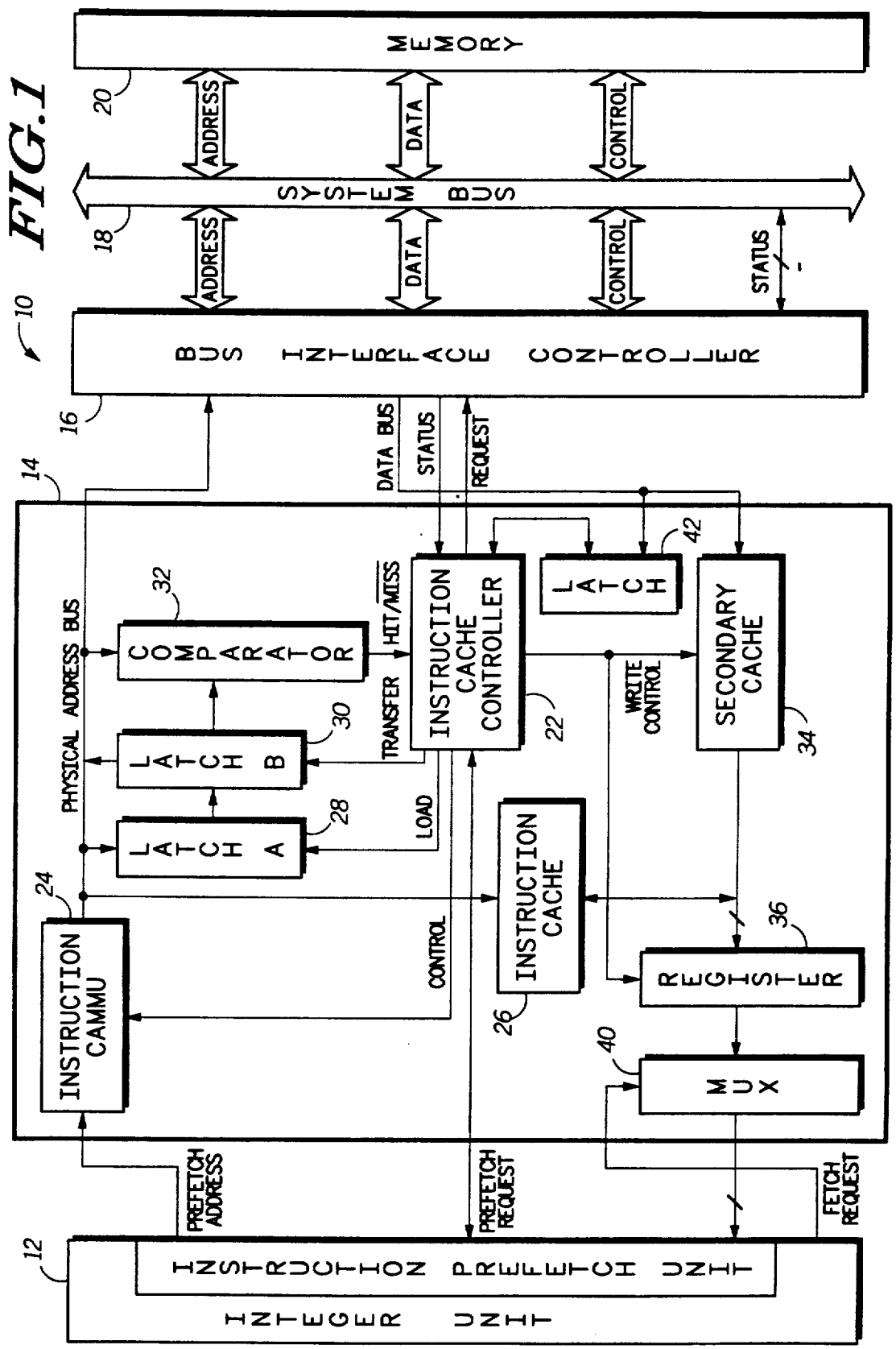
FIG. 1 is a block diagram of a data processing system in accordance with the present invention.

Shown in FIG. 1 is a block diagram illustrating the architecture of a data processing system 10, according to a preferred embodiment of the present invention. Data processing system 10 comprises an integer unit 12, an instruction memory unit 14, a bus interface controller (BIC) 16, a system bus 18, and a memory 20. In the preferred embodiment of the present invention, instruction memory unit 14 comprises an instruction cache controller 22, an instruction cache address memory management unit (CAMMU) 24, an instruction cache 26, a first latch (LATCHA) 28, a second latch (LATCHB) 30, a comparator (COMP) 32, a secondary cache 34, an instruction cache holding register 36, a multiplexor 40, and a latch 42. Instruction cache controller 22 controls the instruction CMMU 24, the instruction cache 26, secondary cache 34, register 36, latch 42, and the operation of LATCHA 28, LATCHB 30, and COMP 32. Instruction cache 26 is a 4-way set-associative cache, with sixty-four (64) sets of four (4), 16-byte cache lines, where each line comprises four longwords (LW0-LW3), and each longword (LW) consists of thirty-two consecutive bits. Accordingly, instruction cache 26 has a total storage capacity of 4 KB.

In the preferred embodiment, integer unit 12 is a pipelined execution unit, with an instruction pipeline (PIPE) capable of pipelining the instruction fetch, effective address calculation and effective address fetch sub-operations. Integer unit 12 contains an instruction prefetch unit which operates in conjunction with the instruction memory unit 14 to keep the cache line holding register 36 loaded, as disclosed in a co-pending U.S. patent application entitled, "A Sequential Prefetch Method For 1, 2 or 3 Word Instructions", Ser. No. SC-00770A, by Russell Reininger et al., and assigned to the assignee hereof. During an instruction prefetch cycle, the integer unit 12 requests a prefetch of 64-bits (cache half-line) of instructions from the instruction memory unit 14, and thereby insures a steady stream of instructions to the PIPE. Accordingly, in operation, integer unit 12 issues a PREFETCH REQUEST signal to the instruction memory unit 14. When the instruction memory unit 14 accepts the prefetch request, the integer unit 12 transfers the logical address for the requested instruction(s) to the CAMMU 24. The CAMMU 24 translates the logical address into a corresponding physical address and places it on the physical address bus (PA BUS). In the preferred embodiment, the instruction cache 26 is accessed using a predetermined number of address bits which are not translated by the CAMMU 24. Thus, CAMMU 24 performs the address translation concurrently with the instruction cache 26 access. When a prefetch "hit" occurs, the instruction cache 26 half-line corresponding to the prefetch request is transferred to register 36. During the same cycle, a predetermined number of instruction words are transferred to the PIPE via MUX 40, in response to a FETCH REQUEST signal from the integer unit 12.

Figure 2:
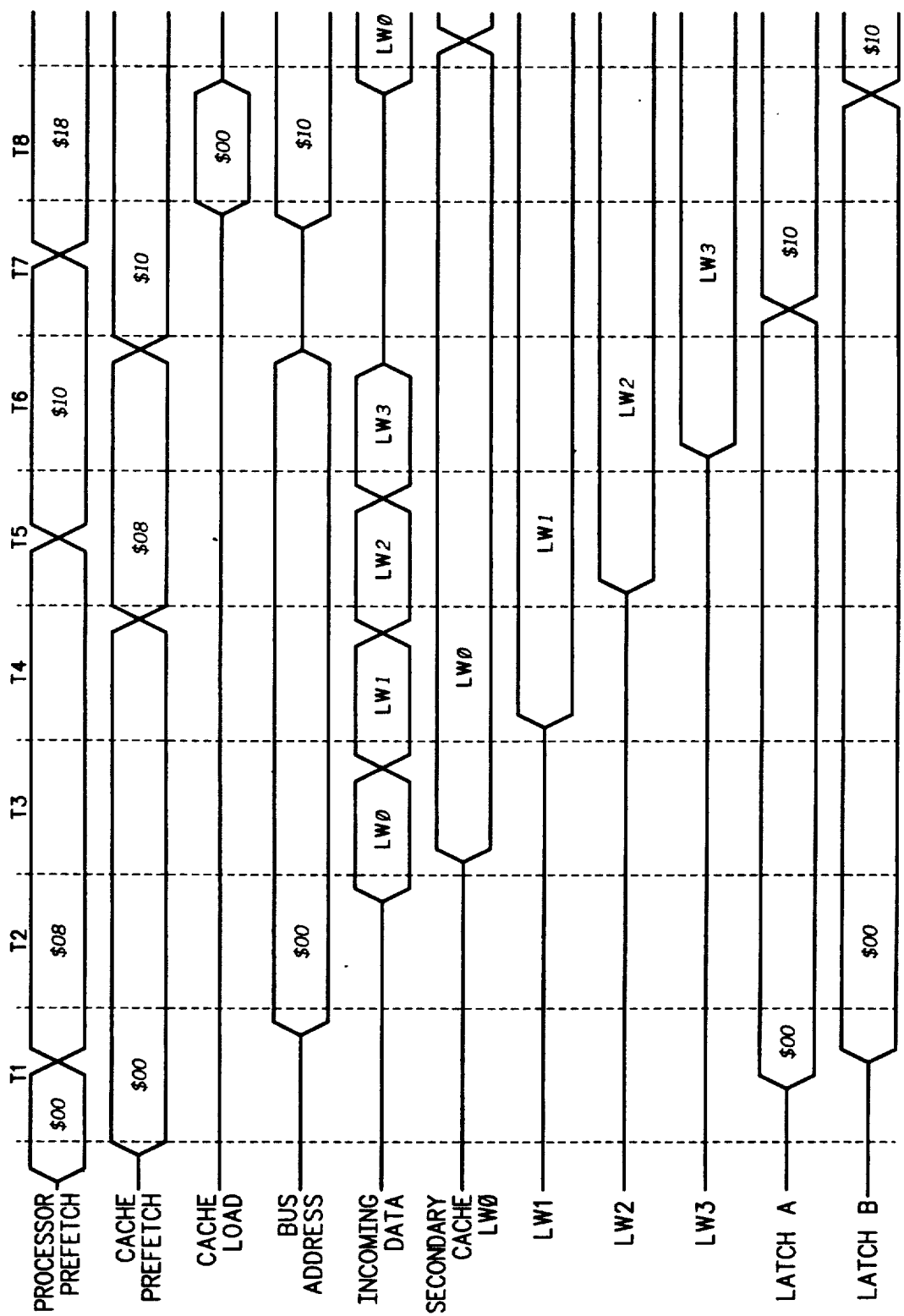
FIG. 2 is a timing diagram of the data processing system operating in accordance with the present invention.
Figure 3:
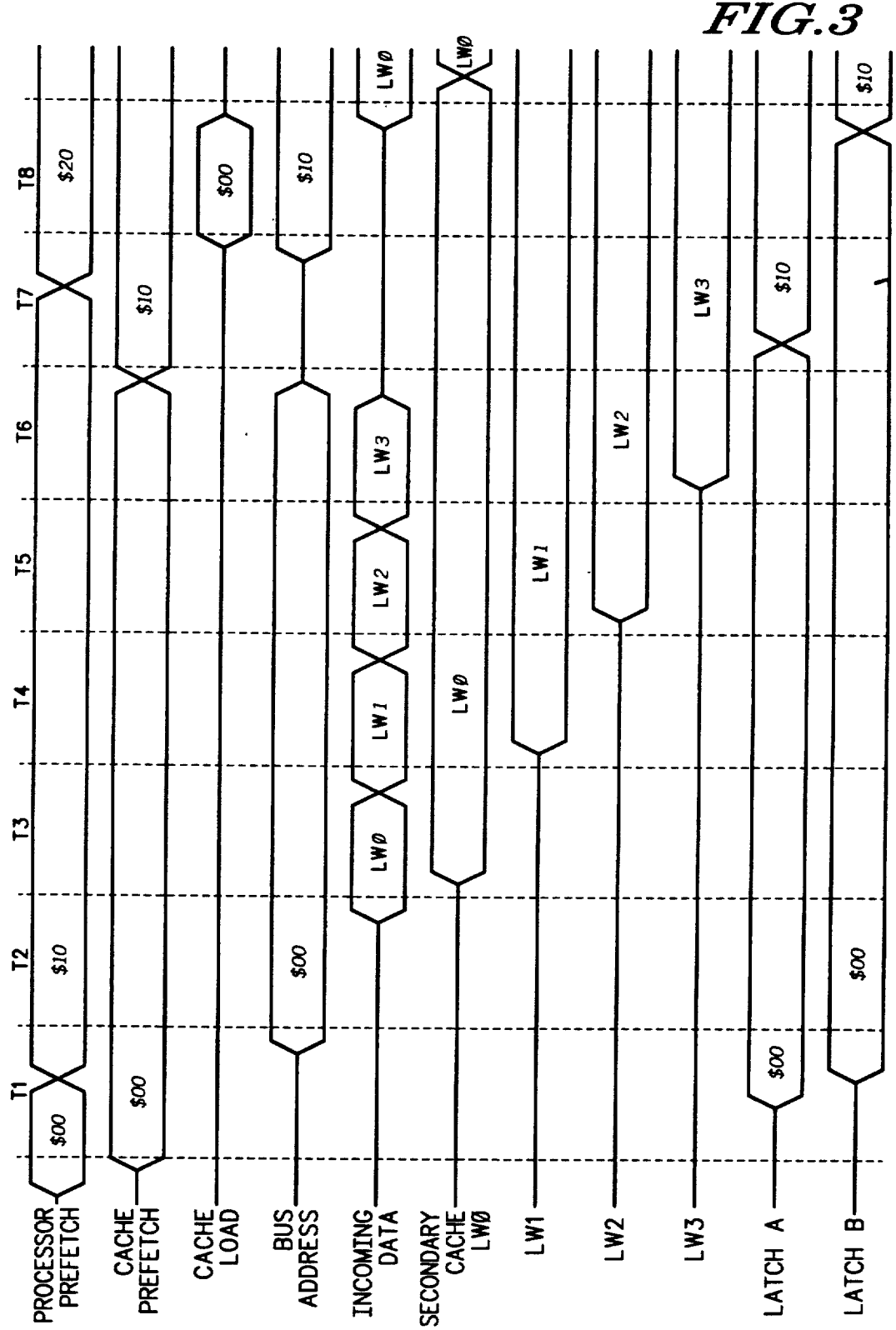
FIG. 3 is an alternate timing diagram for data processing system of FIG. 1.

In the present invention, when a prefetch from the integer unit 12 misses in the instruction cache 26 and in the secondary cache 34, the instruction cache controller 22 detects the prefetch "miss", and issues a BURST REQUEST signal to the BIC 16, thereby requesting a burst transfer to retrieve the cache line (128 bits) from memory 20. The instruction cache controller 22 also transfers the physical address to the BIC 16. When the BIC 16 acknowledges the the BURST REQUEST signal, instruction cache controller 22 asserts a LOAD signal that enables LATCHA 28 to latch the physical address on the PA BUS. LATCHB 30 is enabled to latch the contents of LATCHA 28 at the end of the following machine cycle, for example, the eighth machine cycle, as shown in FIGS. 2 and 3. BIC 16 retrieves the requested cache line (which contains the data for the prefetch request) from the memory 20, via the system bus 18. A set of STATUS signals inform the instruction cache controller 22 of the status of any bus transfer requested by the instruction cache controller 22. As the BIC 16 transfers the requested cache line onto the data bus, the 128-bit secondary cache 34 is loaded with the data. Simultaneously, the instruction cache controller 22 asserts a WRITE CONTROL signal, thereby causing the secondary cache 34 to write the prefetch requested cache half-line (e.g. LW0, LW1) into the cache line holding register 36, during the same cycle that the longword becomes available on the data bus.

When the second longword (LW1) for the prefetch requested cache half-line is received from the data bus, the instruction cache controller 22 accepts the next prefetch request from the integer unit 12, in the following cycle. Concurrent with this prefetch, the instruction cache controller 22 allows the secondary cache 34 to continue to load the data, corresponding to the previous burst request, from the data bus. After the secondary cache 34 finishes writing the cache half-line into register 36, the instruction memory controller 14 accepts the next prefetch from the integer unit 12, and loads the secondary cache 34 with the remaining two longwords from the data bus. The cache line remains stored in the secondary cache 34 until a prefetch "miss" occurs, in the instruction cache 26, for a cache line other than the one stored in the secondary cache 34. Thus, when a prefetch request misses in the instruction cache 26, and the corresponding instruction data for the request is in the secondary cache 34, the integer unit 12 obtains the instruction data from the secondary cache 34. Essentially, the instruction cache controller 22 uses LATCHA 28, LATCHB 30 and COMP 32 to ascertain the contents of the secondary cache 34.

In accordance with the above description, the integer unit 12 issues a prefetch request, accompanied by a logical address, to the instruction memory unit 14. When the prefetch request is accepted by the instruction memory unit 14, the CAMMU 42 translates the logical address into a corresponding physical address, and places it onto the PA BUS. The physical address is routed to the instruction cache 26, for comparison with the indexed entries in the instruction cache 26, and simultaneously routed to COMP 32. The COMP 32 compares the physical address of the current prefetch with the physical address in LATCHB 30, which is the address corresponding to the line currently in the secondary cache 34. Thus, COMP 32 determines whether a hit or a miss occurs in the secondary cache 34, for the prefetch request. When the prefetch request hits in the instruction cache 26, the instruction cache 26 is the source of the instruction data transferred into register 36. When the prefetch request hits in the secondary cache 34, the source of the requested half-line is the secondary cache 34, therefore, the secondary cache 34 transfers the instruction data into register 36. The data in the secondary cache 34 is, therefore, accessible to the integer unit 12 as though it were actually resident in the instruction cache 26.

When the prefetch request misses in both the instruction cache 26 and the secondary cache 34, the instruction cache controller 22 issues a BURST REQUEST signal to the BIC 16, as described above. While the BIC 16 performs the bus transfer, the instruction cache controller 22 loads the instruction cache 26 with the cache line currently stored in the secondary cache 34. Thus, the loading of the instruction cache 26, after the prefetch "miss", does not stall prefetches from the integer unit 12.

In the preferred embodiment of the present invention, integer unit 12 requests prefetches from the instruction memory unit 14 on a half-line basis. Consequently, the instruction memory unit 14 loads the cache line holding register 36 with 64-bits (cache half-line) every prefetch cycle. Since BIC 16 is capable of performing burst transfers of a full cache line of data, a prefetch "miss" causes the instruction cache controller 22 to assert a BURST REQUEST signal for the entire cache line (which contains the prefetch requested half-line). The secondary cache 34 has a storage capacity of 128 bits (an entire cache line), therefore, all four longwords (LW0-LW3) from the burst transfer are stored in the secondary cache 34. Accordingly, the instruction cache controller 22 loads the secondary cache 34 with two longwords (e.g. LW0, LW1) from the data bus. The BIC 16 transfers a valid bit, for each longword loaded into the secondary cache 34, into a latch 42. After receiving the second valid bit (corresponding to LW1), the latch 42 informs the instruction cache controller 22, via a latch control signal, that the BIC 16 loaded the secondary cache 34 with two valid longwords. In response to the latch control signal, the instruction cache controller 22 accepts the next prefetch request from the integer unit 12. Thus, in the present invention, the instruction cache controller 22 can satisfy the current prefetch request, and accept another prefetch request from the integer unit 12, before the BIC 16 completes the burst transfer. During the next prefetch request, the BIC 16 continues loading the secondary cache 34 with the incoming data (LW2, LW3) from the previous burst request.

FIG. 2 illustrates the timing for an overlapped, deferred load of the instruction cache 26, in accordance with the preferred embodiment of the present invention. During the zeroth machine cycle (pre-T1), the integer unit 12 issues a PREFETCH REQUEST signal to retrieve the instruction data stored at hexadecimal address $00. The instruction cache controller 22 issues a BURST REQUEST signal to the BIC 16, due to the occurrence of a prefetch miss. Consequently, the BIC 16 retrieves an entire cache line (sixteen bytes) from memory 20, beginning at address $00. Thus, the BIC 16 loads the secondary cache 34 with a cache line of instructions stored at address $00.

Accordingly, instruction cache controller 22 begins prefetching address $00 at the beginning of the first machine cycle, by issuing the BURST REQUEST signal to the BIC 16, and transferring address $00 to BIC 16. During the first machine cycle, the BIC 16 begins the bus transfer for address $00, while the integer unit 12 issues a PREFETCH REQUEST signal to the instruction cache controller 22 for the next sequential address, $08. In the second machine cycle, the BIC 16 commences to transfer the data corresponding to the requested cache line (LW0-LW3) onto the data bus. During the third and fourth machine cycles, T3 and T4, the BIC 16 loads the secondary cache 34 with the first two longwords (e.g. LW0, LW1), which are loaded into the cache line holding register 36, as described earlier. After the secondary cache 34 finishes writing the cache half-line into register 36, the instruction cache controller 22 accepts the next prefetch (at address $08) from the integer unit 12, while loading the secondary cache 34 with the remaining two longwords (e.g. LW2, LW3), during the fifth and sixth machine cycles, T5 and T6. Since the same cache line is being prefetched, the secondary cache 34 provides the requested data (e.g. LW2, LW3). Consequently, the instruction cache controller 22 does not request a bus transfer, to retrieve the data stored at address $08 from memory 20.

The integer unit 12 issues a PREFETCH REQUEST signal for a next sequential address $10, during the fifth machine cycle T5. In the sixth machine cycle T6, the last longword of the prefetch request for address $08 is loaded into register 36, and the prefetch request is satisfied. Thus, the next prefetch request for address $10 is accepted in the seventh machine cycle T7. Since the prefetch request from the integer unit 12 is for a cache line, other than the one stored in the secondary cache 34, a prefetch "miss" occurs, necessitating another bus transfer to retrieve the requested cache line. Accordingly, the instruction cache controller 22 issues a BURST REQUEST signal to the BIC 16, and begins prefetching the requested cache line, in the seventh machine cycle T7. The BIC 16 initiates the bus transfer during the second half of the seventh machine cycle T7, while the integer unit 12 issues a PREFETCH REQUEST signal for the next sequential address $18.

While the BIC 16 retrieves the requested cache line from memory 20, the instruction cache controller 22 loads the instruction cache 26 with the data (LW0-LW3) at address $00 stored in the secondary cache 34. Thus, the load of the instruction cache 26 is deferred until the beginning of the eighth machine cycle T8, when a prefetch "miss" occurs. Since the integer unit 12 issued the prefetch request for address $10 during the sixth machine cycle T6, the deferment of the cache load until the eighth machine cycle does not stall the integer unit 12. The BIC 16 begins transferring the requested instruction data onto the data bus during the second half of the eighth machine cycle T8.

In an alternate embodiment of the present invention, integer unit 12 accesses the instruction cache 26 on a full cache line basis, therefore, the instruction memory unit 14 loads the cache line holding register 36 with four longwords (128-bits) every prefetch cycle. Accordingly, the instruction prefetch cycles are non-overlapped. FIG. 3 illustrates the timing for a non-overlapped deferred load of the instruction cache 26, in accordance with an alternate embodiment of the present invention. As illustrated in FIG. 3, when using the secondary cache 34, the loading of the instruction cache 26 does not stall the next prefetch from the integer unit 12. Accordingly, in response to a prefetch request from the integer unit 12, the instruction cache controller 22 initiates the cache prefetch of address $00 during the first half of the first machine cycle. In the present invention, the instruction cache controller 22 begins the prefetch cycle for address $00 in the first machine cycle, and simultaneously loads address $00 into LATCHA 28. Upon determining that the requested address ($00) is not resident in either instruction cache 26 or secondary cache 34, the instruction cache controller 22 issues a request to the BIC 16 for a data bus transfer. During the second half of the first machine cycle T1, the BIC 16 begins the bus transfer to retrieve the requested cache line from memory 20, while the integer unit 12 issues a prefetch request for the next address $10. The instruction cache controller 22 transfers address $00 from LATCHA 28 to LATCHB 30, during the second half of the first machine cycle T1, while the BIC 16 begins to transfer the requested instruction data (LW0-LW3) onto the data bus. As the instruction data (LW0-LW3) becomes available on the data bus, the BIC 16 begins to load the secondary cache 34, during the first half of the third machine cycle T3. After marking the data VALID, BIC 16 transfers a STATUS signal to the instruction cache controller 22, thereby indicating that the bus transfer is complete, during the second half of the sixth machine cycle T6.

In the present invention, the loading of the instruction cache 26 is deferred until the next prefetch "miss" occurs, for a cache line other than the one stored in the secondary cache 34. Accordingly, upon receiving the STATUS signal from the BIC 16, the instruction cache controller 22 commences the prefetch of address $10, and simultaneously latches the address ($10) in LATCHA 28, at the beginning of the seventh machine cycle T7. Since address $10 is not resident in the instruction cache 26, or secondary cache 34, another prefetch "miss" occurs. Consequently, the instruction cache controller 22 issues a request signal to the BIC 16 for a bus transfer to retrieve the requested cache line (beginning at address $10) from memory 20. Accordingly, the BIC 16 begins the bus transfer of instruction data stored at address $10 during the second half of the seventh machine cycle T7, while the integer unit 12 issues a prefetch request for the next address $20. While the BIC 16 performs the bus transfer, the instruction cache controller 22 loads the instruction cache 26 from the secondary cache 34, during the eighth machine cycle T8. In the present invention, the instruction cache controller 22 accepts the prefetch request for next address ($10) immediately following the completion of the previous prefetch ($00), therefore, the cache load cycle does not stall the integer unit 12. The BIC 16 begins transferring the requested instruction data (from address $10) onto the data bus during the second half of the eighth machine cycle T8, while the instruction cache controller 22 transfers address $10 from LATCHA 28 to LATCHB 30.

In the present invention, bus snoop requests from the BIC 16 may invalidate a cache line resident in the secondary cache 34, as disclosed in a co-pending U.S. patent application entitled, "A Data Bus Snoop Controller for Concurrent Read and Invalidate Memory Operation", Ser. No. 07/351,898, by William B. Ledbetter et al., and assigned to the assignee hereof. Moreover, a cache invalidate request signal generated by integer unit 12 may also invalidate the cache line resident in secondary cache 34. Thus, the secondary cache 34 provides all of the functional characteristics of a cache structure.

While the present invention has been described in a preferred embodiment, it will be apparent to those skilled in the art that the disclosed invention may be modified in numerous ways and may assume many embodiments other than that specifically set out and described above. For example, the present invention may be used in a system incorporating a data memory unit (not shown), having the same functional counterparts as those of the instruction memory unit 14. Thus, the secondary cache 34 may store a cache line of data, and operate in conjunction with a data cache controller to perform a deferred data cache load. Moreover, as depicted by the alternate embodiment, the integer unit 12 may be modified to access a full cache-line of instruction data every prefetch cycle, and the secondary cache 34 may be modified to enlarge or reduce its storage capacity. Accordingly, it is intended by the appended claims to cover all modifications of the invention which fall within the true spirit and scope of the invention.

We claim:

1. A data processing system having a pipelined data processor with an instruction prefetch unit for prefetching from a memory a plurality of data entries, each entry identified by a memory address, and for providing said plurality of data entries to an instruction pipeline in said pipelined data processor, said data processing system comprising:

a bus controller, coupled to an external memory, for retrieving a requested cache line containing said plurality of data entries, identified by a memory address, from said external memory, in response to a bus transfer request signal, and for transferring said requested cahe line containing said plurality of data entries onto an internal data bus;

a primary cache for storing a plurality of addressable cache lines;

a secondary cache, coupled to said bus controller, said instruction pipeline, and said primary cache, for receiving said requested cache line from said bus controller, for transferring a predetermined number of said plurality of data entries in said request cache line to said instruction pipeline, in response to a first control signal, and for transferring said requested cache line to said primary cahe, in response to a second control signal;

a memory controller, coupled to said pipelined data processor, said bus controller, said primary cache, and said secondary cache, for receiving a prefetch request from said instruction prefetch unit, for providing said bus tranfer request signal, in response to detecting a prefetch address miss in both said primary cache and said secondary cache, said memory controller providing said first control signal to transfer said requested cache line from said secondary cache to said instruction pipeline during a same clock interval that said requested cache line is transferred by said bus controller, and deferring loading said primary cache memory, with said requested cache line from said secondary cache, until said memory controller detects a subsequent prefetch address miss, in said primary cache memory, for a cache line other than said requested cache line resident in said secondary cache, and for providing a third control signal; and addressing means, coupled to said memory controller, for storing said memory address corresponding to said requested cache line stored in said secondary cache, for comparing said memory address to a next memory address corresponding to a next prefetch request from said instruction prefetch unit, in response to said third control signal, and for providing a match signal to said memory controller to indicate whether said next prefetch request is for said cache line stored in said secondary cache.

2. The data processing system according to claim 1 further comprising latching means, coupled to said bus controller, and said secondary cache, for receiving a valid bit, corresponding to each one of said plurality of data entries loaded into said secondary cache, from said internal data bus, and for providing a latch control signal to notify said memory controller that said bus controller has loaded said predetermined number of said plurality of data entries, in said requested cache line, into said secondary cache.

3. The data processing system according to claim 2 wherein said memory controller provides said control signal to enable said secondary cache to transfer said requested cache line to said primary cache after receiving said next prefetch request from said instruction prefetch unit.

4. The data processing system according to claim 3 wherein said addressing means comprises:

storage means for storing said memory address corresponding to said requested cache line stored in said secondary cache; and comparator means for comparing said memory address, corresponding to said requested cache line stored in said secondary cache, to said next memory address corresponding to said next prefetch request from said instruction prefetch unit.

5. The data processing system according to claim 4 wherein said memory controller comprises:

a memory management unit, coupled to said primary cache, and said instruction prefetch unit, for receiving a prefetch address and translating said prefetch address into said memory address, for providing said memory address to said primary cache, and said addressing means, for comparison with said cache lines stored in said primary cache and said secondary cache, respectively; and a cache controller, coupled to said primary cache, said memory management unit, and said addressing means for coupling a matching one of said cache lines to a register, when said cache controller detects a prefetch address hit in said primary cache or said secondary cache, and for transferring said bus transfer request signal to said bus controller when said cache controller detects said prefetch address miss in said primary cache and said secondary cache.

6. The data processing system according to claim 5 wherein said memory controller provides said third control signal to said register, enabling said register to store said predetermined number of said plurality of data entries in said requested cache line transferred from sid secondary cache.

7. A data processing system having a pipelined data processor with an instruction prefetch unit for prefetching from a memory a plurality of data entries, identified by a plurality of memory addresses, and for providing said plurality of data entries to an instruction pipeline in said pipelined data processor, said data processing system comprising:

a bus controller, coupled to an external memory, for retrieving a requested cache line containing said plurality of data entries, identified by a memory address, from said external memory, in response to a bus transfer request signal, and for transferring said requested cache line containing said plurality of data entries onto an internal data bus;

a primary cache for storing a plurality of addressable cache lines;

a secondary cache, coupled to said bus controller, said instruction pipeline, and said primary cache, for receiving said requested cache line from said bus controller, for transferring a predetermined number of said plurality of data entries in said requested cache line to said instruction pipeline, in response to a first control signal, and for transferring said requested cache line to said primary cache memory, in response to a second control signal;

a memory controller, coupled to said pipelined data processor, said bus controller, said primary cache, and said secondary cache, for receiving a prefetch request from said instruction prefetch unit, for providing said bus transfer request signal, in response to detecting a prefetch address miss in both said primary cache and said secondary cache, said memory controller providing said first control signal to transfer said requested cache line from said secondary cache to said instruction pipeline during a same clock interval that said requested cache line is transferred by said bus controller, and deferring loading said primary cache memory, with said requested cache line from said secondary cache, until said memory controller detects a subsequent prefetch address miss, in said primary cache memory, for a cache line other than said requested cache line resident in said secondary cache, and for providing a third control signal, said memory controller comprising:

a memory management unit, coupled to said primary cache, and said instruction prefetch unit, for translating a prefetch address received from said instruction prefetch unit into said memory address, for providing said memory address for comparison with sid cache lines stored in said primary cache and said secondary cache, respectively; and a cache controller, coupled to said primary cache, and said memory management unit, for coupling a matching one of said plurality of cache lines to a register, when said cache controller detects a prefetch address hit in said primary cache or said secondary cache, and for transferring said bus transfer request signal to said bus controller when said cache controller detects said prefetch address miss in said primary cache and said secondary cache; and addressing means, coupled to said memory controller, for storing said memory address, corresponding to said cache line stored in said secondary cache, for comparing said memory address to a next prefetch address corresponding to a next prefetch request from said instruction prefetch unit, in response to said third control signal from said memory controller, and for providing a match signal to said memory controller, indicating whether said next prefetch request is for said cache line stored in said secondary cache.

8. The data processing system according to claim 7 further comprising latching means, coupled to said bus controller, and said secondary cache, for receiving a valid bit, correponsding to each one of said plurality of data entries loading into said secondary cache, from said internal data bus, and for providing a latch cobtrol signal to notify said memory controller that said bus controller has loaded said predetermined number of said plurality of data entries, in said requested cache line, into said secondary cache.

9. The data processing system according to claim 8 wherein said memory controller provides said second control signal to enable said secondary cache to transfer said requested cache line to said primary cache after receiving said next prefetch request from said instruction prefecth unit.

10. The data processing system according to claim 9 wherein said addressing means comprises:
storage means for storing said memory address corresponding to said requested cache line stored in said secondary cache; and
comparator means for comparing said memory address, corresponding to said requested cache line stored in said secondary cache, to said next memory address corresponding to said next prefetch request from said instruction prefetch unit.

11. A data processing system having a pipelined data processor with an instruction prefetch unit for prefetching from a memory a plurality of data entries, each entry identified by a memory address, and for providing said plurality of data entries to an instruction pipeline in said pipelined data processor, said data processing system conprising:
a bus controller, coupled to an external memory, for retrieving said plurality of data entries, identified by a memory address, from said external memory, in response to a bus transfer request signal, and for transferring said plurality of dta entries onto an internal data bus;
a primary cache for storing a plurality of addressable cache lines;
a secondary cache, coupled to said bus controller, said instruction pipeline, and said primary cache, for receiving said plurality of data entries from said bus controller, for transferring a predetermined number of said plurality of data entries into said instruction pipeline, in response to a first control signal, and for transferring said predetermined number of said plurality of data entries to said primary cache, in response to a second control signal;
a memory controller, coupled to said pipelined data processor, said bus controller, said primary cache, and said secondary cache, for receiving a prefetch address from said instruction prefetch unit and translating said prefetch address into a corresponding memory address, for retrieving said plurality of data entries, stored at said corresponding memory address from said primary cache, upon detecting a prefetch address hit in said primary cache, and for providing said bus transfer request upon detecting a prefetch address miss in said primary cache and said secondary cache, said memory controller comprising:
a memory management unit, coupled to said primary cache, and said instruction prefetch unit, for translating said prefetch address into a corresponding memory address; and
a cache controller, coupled to said primary cache, and said memory management unit, for coupling a matching one of said plurality of addressable cache lines to a register, in response to detecting a prefetch hit in said primary cache or said secondary cache, for transferring said bus transfer request signal to said bus controller in response to detecting a prefetch miss in said primary cache and said secondary cache, for providing said first control signal to said secondary cache with the requested cache line, and for providing said second control signal to load said primary cache with said requested cache line resident in said second cache; and
addressing means, coupled to said memory controller, for storing said memory address corresponding to said plurality of data entries stored in said secondary cache, for comparing said memory address to an next memory address corresponding to a next prefetch request from said instruction prefetch unit, and for providing a match signal to said memory controller, indicating whether said next prefetch request is for said plurality of data entries stored in said secondary cache.

12. The data processing system according to claim 11 further comprising latching means, coupled to said bus controller, and said secondary cache, for receiving a valid bit, corresponding to each one of said plurality of data entries loaded into said secondary cache, from said internal data bus, and for providing a latch control signal to notify said memory controller that said bus controller has loaded said predetermined number of said plurality of data entries, in said requested cache line, into said secondary cache.

13. The data processing system according to claim 12 wherein said memory controller provides said second control signal to enable said secondary cache to transfer said requested cache line to said primary cache after receiving said next prefetch request from said instruction prefetch unit.

14. The data processing system according to claim 13 wherein said addressing means comprises:
storage means for storing said memory address corresponding to said cache line stored in said secondary cache; and
comparator means for comparing said memory address to a next memory address corresponding to a next prefetch request from said instruction prefetch unit.

* * * * *

UNITED STATES PATENT AND TRADEMARK OFFICE
CERTIFICATE OF CORRECTION

PATENT NO. : 5,170,476

DATED : December 8, 1992

INVENTOR(S) : Pamela S. Laakso et al.

Page 1 of 2

It is certified that error appears in the above-identified patent and that said Letters Patent is hereby corrected as shown below:

Column 8,
In claim 1, line 59,
change "cahe" to --cache--.

Column 8,
In claim 1, line 48,
change "cahe" to --cache--.

Column 10, line 6
In claim 6,
change "sid" to --said--.

Column 10,
In claim 7, line 57,
change "sid" to --said--.

Column 11,
In claim 8, line 15,
change "correponsding: to --corresponding--.

In claim 8, line 17,
change "cobtrol" to --control--.

UNITED STATES PATENT AND TRADEMARK OFFICE
CERTIFICATE OF CORRECTION

PATENT NO. : 5,170,476

DATED : December 8, 1992

INVENTOR(S) : Pamela S. Laakso et al

It is certified that error appears in the above-identified patent and that said Letters Patent is hereby corrected as shown below:

```
Column 11, line 27, claim 11, change "prefecth" to --prefetch --.
           line 49, change "dta to --data --.
           line 33, change "an" to --a--.
           line 44, change "conprising" to --comprising --.
```

Signed and Sealed this

Seventh Day of December, 1993

Attest:

BRUCE LEHMAN

*Attesting Officer*     *Commissioner of Patents and Trademarks*